(12) United States Patent
Yamakawa et al.

(10) Patent No.: US 9,991,047 B2
(45) Date of Patent: Jun. 5, 2018

(54) ANTENNA COIL UNIT

(71) Applicant: EQUOS RESEARCH CO., LTD., Tokyo (JP)

(72) Inventors: Hiroyuki Yamakawa, Tokyo (JP); Kenichirou Satou, Tokyo (JP)

(73) Assignee: EQUOS RESEARCH CO., LTD., Tokyo (JP)

( * ) Notice: Subject to any disclaimer, the term of this patent is extended or adjusted under 35 U.S.C. 154(b) by 198 days.

(21) Appl. No.: 14/428,387

(22) PCT Filed: Jun. 27, 2014

(86) PCT No.: PCT/JP2014/067128
§ 371 (c)(1),
(2) Date: Mar. 16, 2015

(87) PCT Pub. No.: WO2014/208715
PCT Pub. Date: Dec. 31, 2014

(65) Prior Publication Data
US 2015/0235761 A1    Aug. 20, 2015

(30) Foreign Application Priority Data

Jun. 28, 2013  (JP) .................................. 2013-136529

(51) Int. Cl.
*H01F 38/14* (2006.01)
*H02J 17/00* (2006.01)
(Continued)

(52) U.S. Cl.
CPC ............. *H01F 38/14* (2013.01); *H02J 5/005* (2013.01); *H02J 17/00* (2013.01); *H02J 50/12* (2016.02)

(58) Field of Classification Search
CPC ..................................................... H01F 38/14
(Continued)

(56) References Cited

U.S. PATENT DOCUMENTS 8,310,202 B2 *  11/2012  Scudiere ................. H01F 38/14
                                                          310/50
8,519,570 B2     8/2013  Koumoto
(Continued)

FOREIGN PATENT DOCUMENTS

EP       2 305 511 A1    4/2011
EP       2 953 239 A1   12/2015
(Continued)

OTHER PUBLICATIONS

Aug. 12, 2014 International Search Report issued in International Application No. PCT/JP2014/067128.
(Continued)

*Primary Examiner* — Rexford Barnie
*Assistant Examiner* — Joseph Inge
(74) *Attorney, Agent, or Firm* — Oliff PLC (57) ABSTRACT

The antenna coil unit includes a main coil and an auxiliary coil electrically insulated from the main coil, the auxiliary coil being arranged at a position in which an induction current is produced by a magnetic field produced by an electric current flowing through the main coil. The auxiliary coil is configured in a state in which a frequency deviating by a predefined amount in a predefined direction from a target frequency predefined within a harmonic component of the fundamental component of an electromagnetic wave produced by the electric current flowing through the main coil is taken as a resonance frequency. The direction and amount are such that the phase of an alternating-current current flowing through the auxiliary coil is in an opposite-phase state, which is opposite the phase of the harmonic component of an AC current flowing through the main coil.

4 Claims, 5 Drawing Sheets

(51) Int. Cl.
*H02J 5/00* (2016.01)
*H02J 50/12* (2016.01)

(58) Field of Classification Search
USPC .......................................................... 307/104
See application file for complete search history.

(56) References Cited

U.S. PATENT DOCUMENTS

| | | | |
|---|---|---|---|
| 9,509,270 B2 | 11/2016 | Yamakawa et al. | |
| 2011/0101792 A1* | 5/2011 | Koumoto | ................ B60L 5/005 |
| | | | 307/104 |
| 2013/0038281 A1* | 2/2013 | Sakakibara | ............. B60L 5/005 |
| | | | 320/108 |
| 2016/0173051 A1 | 6/2016 | Yamakawa et al. | |

FOREIGN PATENT DOCUMENTS

| | | |
|---|---|---|
| JP | 2011-234496 A | 11/2011 |
| JP | 2012-115069 A | 6/2012 |
| WO | 2011/135424 A2 | 11/2011 |

OTHER PUBLICATIONS

Jan. 31, 2017 Search Report issued in European Patent Application No. 14818672.9.

* cited by examiner

ANTENNA COIL UNIT

TECHNICAL FIELD

The present invention relates to an antenna coil unit for transmitting electric power or the like.

BACKGROUND ART

Cellular phones, personal digital assistants (PDAs), power-assisted bicycles, electric vehicles, hybrid vehicles, and other electrical devices and electromechanical apparatuses that are transportable without being left in one location have internal cells and other power storage devices so as to be capable of operating without being supplied by an external power supply. In many cases, charging of a power storage device is performed via a connection between a charge port provided to the device or apparatus and a power-supply device, interposed by a cable or the like. However, in recent years, there has been a demand for a technique for supplying electric power wirelessly without using such a cable, that is, without contact. In one technique for supplying electric power without contact, electromagnetic resonance coupling (referred to merely as "magnetic field resonance" below where appropriate) may be used. Magnetic field resonance is a technique in which a pair of resonance circuits having a natural frequency (resonance frequency) in common, e.g., a resonance circuit on the power-supplying equipment and a resonance circuit on the device or apparatus, are caused to resonate via a magnetic field, and electric power is transmitted via the magnetic field. Japanese Laid-open Patent Application No. 2011-234496 (Patent Document 1) discloses a technique for using magnetic field resonance to supply power without contact to a vehicle from a power source external to the vehicle.

However, when power is supplied via magnetic field resonance, a magnetic field produced around a coil unit including a resonance coil (antenna coil) provided to the resonance circuit, the resonance coil serving as an antenna, may produce electromagnetic noise. Electronic equipment or the like arranged around the coil unit may thereby be affected by the electromagnetic noise. For example, in power supply to a vehicle, it is possible for audible noise to be produced in on-board audio. Additionally, if a conductor made of metal or another such material is present within the magnetic field, it is possible for the conductor to be heated due to the electromagnetic noise. For example, when a coil unit is installed in the bottom part of a vehicle, metal components in the bottom part of the vehicle may be heated. Therefore, a technique for suppressing such electromagnetic noise is required. The coil unit disclosed in Patent Document 1 includes a plurality of resonance coils, the resonance coils being arranged so that the magnetic field produced in one resonance coil and the magnetic field produced in at least one other resonance coil are in opposite phases with regard to each other. This counterbalances the magnetic fields in areas beyond the resonance circuits and reduces magnetic field leakage (paragraphs 5-12, etc.). However, because the magnetic fields are counterbalanced, the strength of the magnetic field when the same electric power is imparted to the power-supply-side resonance coil is reduced, and the efficiency of power supply is also reduced. Because the resonance frequencies of the plurality of coils are set to the same value, harmonic noise is inadequately suppressed.

Japanese Laid-open Patent Application No. 2012-115069 (Patent Document 2) discloses an antenna coil configured as a composite coil including a flat coil and a loop coil arranged therein. According to Patent Document 2, the antenna coil is configured so that the magnetic flux generated by the flat coil can be counterbalanced by the loop coil. Patent Document 2 indicates that, when an electric current is passed through the flat coil, it is only when the frequency corresponding to the electric current matches the resonance frequency of the resonance circuit that includes the loop coil that the loop coil will be magnetized by electromagnetic induction, so that magnetic flux in a direction opposite that of the magnetic flux generated by the flat coil will be generated.

Specifically, in Patent Document 2, the resonance frequency of the resonance circuit that includes the noise-canceling loop coil is made to match the frequency of the noise to be canceled, whereby noise is reduced (paragraph 39, etc.). However, in, e.g., wireless power transmission by magnetic field resonance, a pronounced noise-reduction effect is not necessarily obtained even when the frequency of the noise source and the resonance frequency of the noise-canceling resonance circuit are made to match in this manner; this problem is becoming apparent in the experiments, etc. performed by the inventor(s).

PRIOR ART DOCUMENTS

Patent Documents

Patent Document 1: Japanese Laid-open Patent Application No. 2011-234496
Patent Document 2: Japanese Laid-open Patent Application No. 2012-115069

SUMMARY OF THE INVENTION

Technical Problem

In view of the foregoing, there has been a need for a technique in which noise components such as harmonic components of the fundamental component of an electromagnetic wave produced by an electric current flowing through a main coil that functions as an antenna is suppressed while the attenuation of the fundamental component is minimized.

Solution to Problems

An antenna coil unit according to the present invention designed in view of the abovementioned problem includes:
a main coil configured by winding a conducting wire around a first reference axis; and
an auxiliary coil configured by winding a conducting wire around a second reference axis in a state of being electrically insulated from the main coil, the auxiliary coil being arranged at a position in which an induction current is produced by a magnetic field produced by an electric current flowing through the main coil;
the auxiliary coil being configured in a state in which a frequency deviating by a predefined amount in a predefined direction from a target frequency predefined within a harmonic component of the fundamental component in an electromagnetic wave produced by the electric current flowing through the main coil is taken as a resonance frequency; and
the direction and amount being such that the phase of an alternating-current (AC) current flowing through the auxiliary coil is in an opposite-phase state, which is opposite the phase of the harmonic component in an AC current flowing through the main coil.

The term "opposite-phase state" used here refers to a state in which the difference in phase between the phase of the AC current flowing through the main coil and the phase of the AC current flowing through the auxiliary coil equals 180°±less than 90° (90°<difference in phase<270°).

When the antenna coil unit is configured in this manner, the magnetic flux of the frequency component including the noise component, within the magnetic flux produced by the electric current flowing through the main coil, is drawn into the auxiliary coil and then returned to the main coil via the auxiliary coil. Specifically, the magnetic flux of the noise component generated by the main coil advances toward the auxiliary coil, which is arranged near enough that an induction current is produced due to the magnetic flux, without advancing a long distance. As a result, it is possible to suppress noise components located a long distance from the auxiliary coil as viewed from the main coil. The inspections, experiments, simulations, etc. performed by the inventor(s) have confirmed that a more pronounced noise-suppression effect is achieved when the resonance frequency of the auxiliary coil is set to a frequency that is shifted to a certain extent from the frequency of the noise component to be suppressed, rather than to the frequency of the noise component to be suppressed. The noise component having the most pronounced impact is often a harmonic component of the fundamental component of an electromagnetic wave produced by the electric current flowing through the main coil; the resonance frequency of the auxiliary coil preferably is a frequency that deviates from the harmonic component under predefined conditions. Thus, with the antenna coil unit according to the present invention, it is possible to suppress a noise component such as a harmonic component of the fundamental component of an electromagnetic wave produced by an electric current flowing through a main coil that functions as an antenna while minimizing the attenuation of the fundamental component.

Examples of preferred embodiments of the present invention will be described below.

In the antenna coil unit according to the present invention, as an example of one embodiment, the first reference axis and the second reference axis are preferably parallel. When the first reference axis and the second reference axis are parallel, the main coil and the auxiliary coil can be arranged on substantially the same plane; therefore, increases in the size of the antenna coil unit can be minimized.

In the antenna coil unit according to the present invention, it is preferable to use, e.g., electromagnetic resonance coupling (referred to merely as "magnetic field resonance" below where appropriate) and to apply electromagnetic resonance coupling to a device for transmitting electric power without contact. Specifically, as an example of one embodiment, the main coil of the antenna coil unit according to the present invention can be applied as a primary coil constituting a power-supply circuit and/or as a secondary coil constituting a power-receiving circuit in a power-supply device for transmitting electric power from the power-supply circuit to the power-receiving circuit using electromagnetic resonance coupling.

In order to produce the opposite-phase state described above, it is necessary for the harmonic component AC currents flowing through the conducting wire of the main coil and the conducting wire of the auxiliary coil to be oriented in different directions. As an example of a preferred embodiment, the opposite-phase state may be a state in which, as viewed from a direction along the first reference axis, the harmonic component AC currents flowing through the conducting wire of the main coil and the conducting wire of the auxiliary coil are oriented in different directions at the peaks of the harmonic components. The term "peak" used here refers to both positive- and negative-direction peaks (peaks and troughs) of the harmonic component. The phrase "a state in which . . . the harmonic component AC currents . . . are oriented in different directions at the peaks of the harmonic components" used here refers to a circumstance in which, when the phases of the peaks of the harmonic component AC current flowing through the conducting wire of the main coil and of the peaks of the harmonic component AC current flowing through the conducting wire of the auxiliary coil are shifted, the orientation of either one of the harmonic component AC currents is reversed at the peaks of the other harmonic component AC current. Most preferably, the phrase "a state in which . . . the harmonic component AC currents . . . are oriented in different directions" refers to a state in which the peaks of the harmonic component AC current flowing through the conducting wire of the main coil and the peaks of the harmonic component AC current flowing through the conducting wire of the auxiliary coil are in a relationship such that either one of the harmonic component AC currents has a negative-direction peak when the other of the harmonic component AC currents has a positive-direction peak.

DESCRIPTION OF EMBODIMENT

Figure 1:
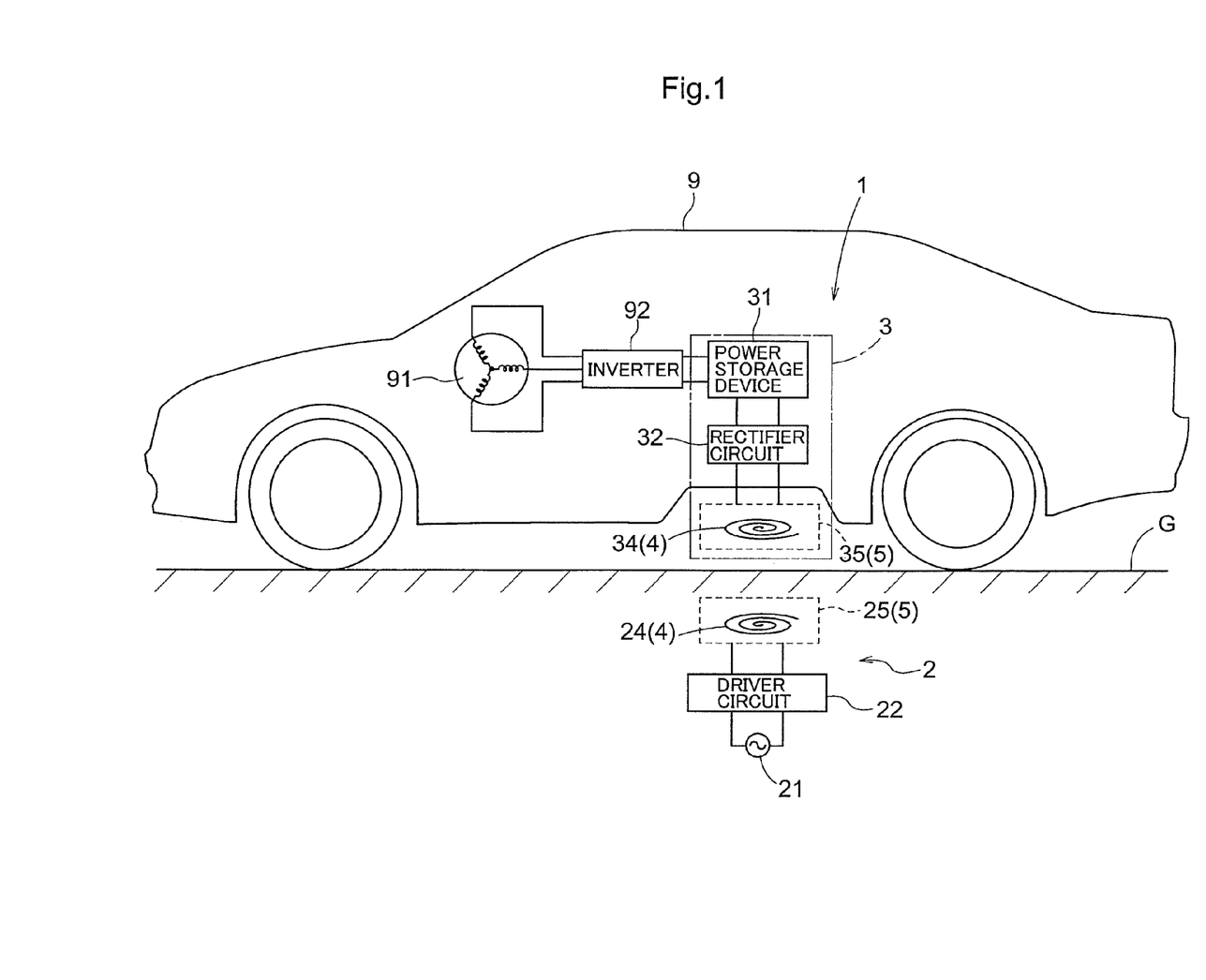
FIG. 1 is a block diagram schematically showing the configuration of a wireless power-supply system.

Embodiments of the present invention will be described below, as examples of a wireless power-supply system for using electromagnetic resonance coupling (referred to merely as "magnetic field resonance" below where appropriate) to perform wireless power supply (wireless power transmission) to a vehicle, with reference to the accompanying drawings. As shown in FIG. 1, a wireless power-supply system 1 (magnetic-field-resonance-type power supply device) is configured from a power-supply system 2 installed in a power-supply facility, and a power-receiving system 3 mounted in a vehicle 9. In the present embodiment, the power-supply system 2 is installed, e.g., near the ground G if the facility is outdoors, or near the floor if the facility is indoors.

As shown in FIG. 1, the power-supply system 2 is configured to have an AC power source 21, a driver circuit 22, and a power-supply-side resonance circuit 25. The power-supply-side resonance circuit 25 is configured to have a power-supply-side resonance coil 24. The power-receiving system 3 is configured to have a power-receiving-side resonance circuit 35, a rectifier circuit 32, and a power storage device 31. The power-receiving-side resonance circuit 35 is configured to have a power-receiving-side resonance coil 34. The power-supply-side resonance circuit 25 and the power-receiving-side resonance circuit 35 are resonance circuits having the same natural frequency (resonance frequency), the two resonance circuits 25, 35 being referred to collectively as "resonance circuits 5." The power-supply-side resonance coil 24 and the power-receiving-side resonance coil 34 are referred to collectively as either "resonance coils" or "antenna coils 4."

The AC power source 21 of the power-supply system 2 is, e.g., a power source (system power source) supplied from a commercial distribution network owned by a power company; the frequency of the AC power source is, e.g., 50 or 60 Hz. The driver circuit 22 is a circuit for converting the 50- or 60-Hz frequency of the system power source to the resonance frequency of the power-supply-side resonance circuit 25 (the resonance circuit 5), the driver circuit 22 being configured from a high frequency power source circuit. The power storage device 31 of the power-receiving system 3 is a direct-current (DC) power source capable of being electrically charged and discharged, the power storage device 31 using, e.g., a lithium-ion, nickel-metal-hydride, or other type of secondary cell, or a capacitor. The electric power received by the power-receiving-side resonance circuit 35 is AC power having the resonance frequency of the power-receiving-side resonance circuit 35. The rectifier circuit 32 rectifies the AC power having the resonance frequency to DC power. The driver circuit 22 and the power-supply-side resonance circuit 25 working in conjunction with each other, or the entire power-supply system 2, is comparable to a power-supply circuit in the broadest sense. The power-supply-side resonance circuit 25 is comparable to a power-supply circuit in a more limited sense. Similarly, the power-receiving-side resonance circuit 35 and the rectifier circuit 32 working in conjunction [with each other], or the entire power-receiving system 3, is comparable to a power-receiving circuit in the broadest sense. The power-receiving-side resonance circuit 35 is comparable to a power-receiving circuit in a more limited sense.

The vehicle 9 is, e.g., an electric vehicle driven by a rotating electrical machine 91, or a hybrid vehicle driven by an internal combustion engine (not shown) and a rotating electrical machine 91. The rotating electrical machine 91 is connected to the power storage device 31 interposed by, e.g., an inverter 92 or other driver for a rotating electrical machine. In the present embodiment, the rotating electric machine 91 is, e.g., a three-phase AC rotating electrical machine, the driver for a rotating electrical machine being configured to have the inverter 92 for converting electric power to/from DC and AC as a core. The rotating electrical machine 91 can function as an electric motor and as a power generator.

The wireless power-supply system 1 (magnetic-field-resonance-type power supply device) is a system for causing the pair of resonance circuits 5 (25, 35) to resonate via a magnetic field, and transmitting power via the magnetic field. Magnetic resonance imaging (MRI), which is frequently used in the medical field, is known as a "resonance" technique using "magnetic properties"; however, whereas MRI uses the physical phenomenon of "magnetic-spin resonance," no such physical phenomenon is used in the "magnetic-field-resonance-type power supply device" of the present invention. In the "magnetic-field-resonance-type power supply device" of the present invention, as described above, two resonance circuits 5 are caused to resonate via a "magnetic field." Therefore, the transmission scheme employed in the wireless power-supply system 1 for transmitting electric power using resonance in a magnetic field is referred to here as "electromagnetic resonance coupling" or "magnetic field resonance," taking into account its clear distinction from MRI. This method of transmission also differs from "electromagnetic induction."

Figure 2:
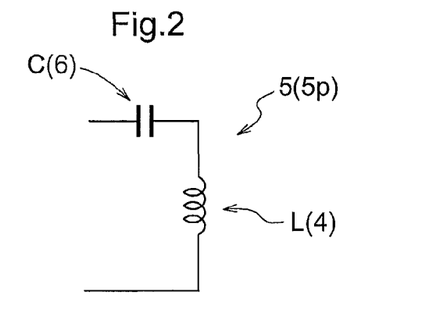
FIG. 2 is a representative circuit schematic of a resonance circuit.

As described above, the power-supply-side resonance circuit 25 and the power-receiving-side resonance circuit 35 have the same natural frequency (resonance frequency). In the present embodiment, the power-supply-side resonance circuit 25 and the power-receiving-side resonance circuit 35 are LC resonators having the same configuration. Therefore, in the description below, the two resonance circuits 25, 35 are described as "resonance circuits 5" when there is no need to distinguish between them. As shown in the representative circuit schematic in FIG. 2, the resonance circuits 5 are configured to have antenna coils 4 having inductance components "L," and capacitors 6 having capacitance components "C."

The power-supply-side resonance circuit 25 and the power-receiving-side resonance circuit 35 have the same resonance frequency. The power-supply-side resonance circuit 25 and the power-receiving-side resonance circuit 35 resonate together in the same way, for example, as when one of two tuning forks arranged so as to be set apart from each other is caused to vibrate in air, the other tuning fork resonating with the vibration transmitted via the air and vibrating. More specifically, the power-receiving-side resonance circuit 35 resonates (electromagnetically vibrates) with the resonance (electromagnetic vibration) transmitted thereto via the magnetic field produced by the electromagnetic vibration of the power-supply-side resonance circuit 25.

The wireless power-supply system 1 preferably supplies power by highly efficient transmission while suppressing leakage of the magnetic flux to spaces other than the space formed by the magnetic fields coupling the power-supply-side and power-receiving-side resonance circuits 5. In order to realize this objective, the present invention is configured from a resonance circuit unit 50 including a resonance circuit additional to the resonance circuits 5 (an auxiliary resonance circuit 5c). The auxiliary resonance circuit 5c operates to suppress the electromagnetic waves constituting the noise component. When a particular distinction is to be made with respect to the power-transmitting resonance circuits 5 in the resonance circuit units 50, the term "main resonance circuit 5p" is used to refer to the circuit that corresponds to the auxiliary resonance circuit 5c. As described below, antenna coils (main coil 41, auxiliary coil 42) constituting the main resonance circuit 5p and the auxiliary resonance circuit 5c, respectively, are provided to the resonance circuit unit 50 in a predefined relative arrangement. These antenna coils are collectively referred to here as an antenna coil unit 40.

Figure 3:
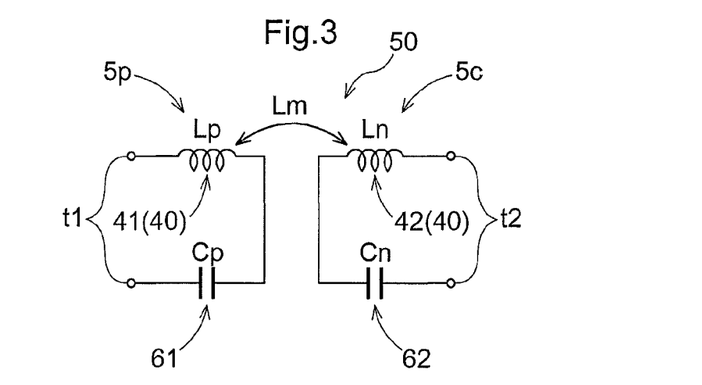
FIG. 3 is a representative circuit schematic of a resonance circuit unit.

As shown in FIG. 3, the resonance circuit unit 50 is configured to include the main resonance circuit 5p, which is configured to include the main coil 41, and the auxiliary resonance circuit 5c, which is configured to include the auxiliary coil 42. The main coil 41 is configured by winding a conducting wire around a first reference axis X1 (see FIGS. 5-8), and constitutes the resonance circuits 5 (main resonance circuit 5p) described above. The auxiliary coil 42 is configured by winding a conducting wire around a second reference axis X2 (see FIGS. 5-8) in a state of being electrically insulated from the main coil 41. Additionally, the auxiliary coil 42 is arranged at a position in which an induction current is produced by a magnetic field produced by the electric current flowing through the main coil 41. The auxiliary coil 42 is configured in a state in which a frequency deviating by a predefined amount in a predefined direction from a target frequency predefined within a harmonic component of the fundamental component of an electromagnetic wave produced by the electric current flowing through the main coil 41 is taken as a resonance frequency (fc), and constitutes the auxiliary resonance circuit 5c described above. The direction and amount used here are such that the phase of an AC current flowing through the auxiliary coil 42 is in an opposite-phase state, which is opposite the phase of the harmonic component in the AC current flowing through the main coil 41. The "opposite-phase state" will be described below.

As described above, the main coil 41 (antenna coil 4) of the main resonance circuit 5p (resonance circuits 5) functions as a transmitting/receiving antenna of the wireless power-supply system 1. Specifically, in the power-supply device (wireless power-supply system 1) for transmitting electric power from the power-supply circuit (power-supply system 2) to the power-receiving circuit (power-receiving system 3) using electromagnetic resonance coupling, the main coil 41 functions as a primary coil constituting the power-supply circuit and/or as a secondary coil constituting the power-receiving circuit. The main resonance circuit 5p generates an electromagnetic field of a resonance frequency defined by the main coil 41 having an inductance component "Lp," and a capacitor 61 having a capacitance component "Cp." Alternatively, an electric current may be passed through the main coil 41 (antenna coil 4) by the action of an electromagnetic field of this resonance frequency.

Conversely, a resonance frequency (fc) of the auxiliary resonance circuit 5c, is defined by the auxiliary coil 42, which has an inductance component "Ln," and a capacitor 62, which has a capacitance component "Cn." This resonance frequency differs from the resonance frequency of the main resonance circuit 5p; the auxiliary resonance circuit 5c does not contribute to the transmission of electric power. The resonance frequency of the auxiliary resonance circuit 5c is set on the basis of the harmonic component of the fundamental component in the resonance frequency of the main resonance circuit 5p. The harmonic component, e.g., a fifth-order, seventh-order, ninth-order, or other high-order harmonic component, may act on other devices or the like as a noise component. The auxiliary resonance circuit 5c is a noise-canceling resonance circuit that acts so as to cause the electromagnetic wave of the noise component produced by the electromagnetic field generated by the main resonance circuit 5p to attenuate. The symbol "Lm" in FIG. 3 signifies the relative inductance between the main coil 41 and the auxiliary coil 42.

A terminal pair t1 of the main resonance circuit 5p is connected to the driver circuit 22 or the rectifier circuit 32, as shown in FIG. 1. Conversely, a terminal pair t2 of the auxiliary resonance circuit 5c are connected to each other to form a closed circuit; the terminal pair t2 resonates with the electromagnetic wave generated by the main resonance circuit 5p, whereby an electric current flows within the closed circuit. In the description below, circuit characteristics are described as performing power transmission from the main resonance circuit 5p to the auxiliary resonance circuit 5c. The sharpness "Q" of the resonance of the main resonance circuit 5p and the auxiliary resonance circuit 5c is "50" or higher, and preferably increases the transmission efficiency.

Figure 4:
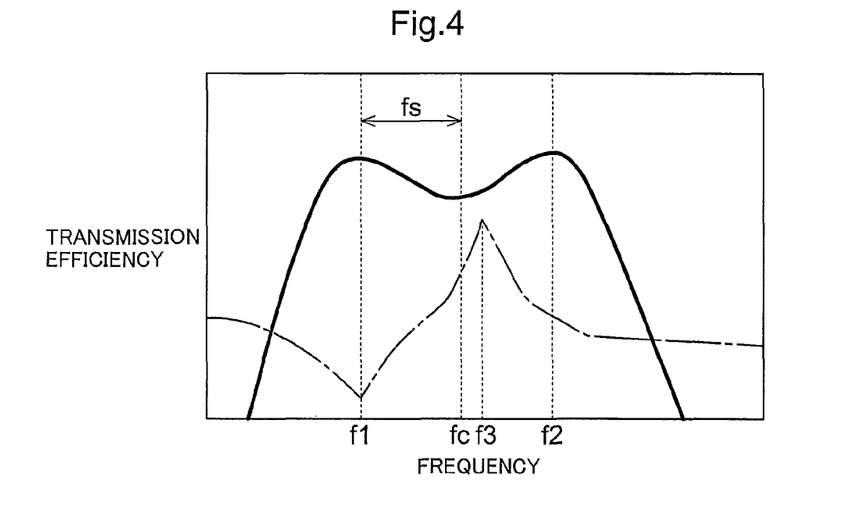
FIG. 4 is a diagram showing frequency characteristics of the transmission efficiency and the noise emission rate.
Figure 5:
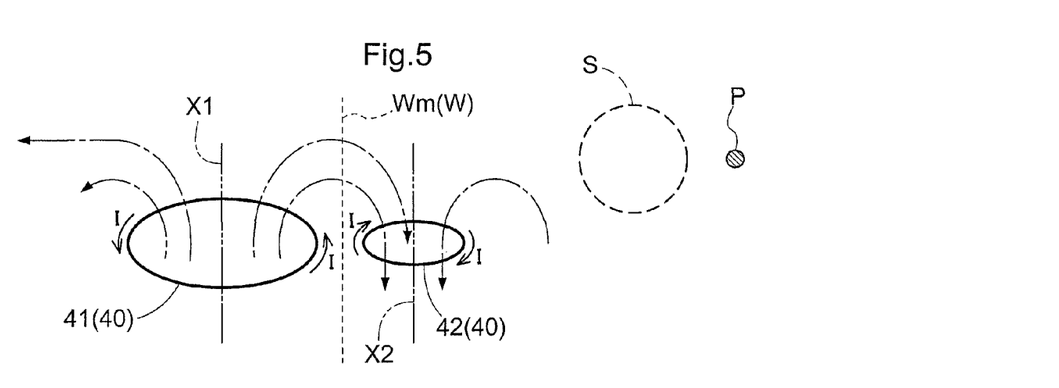
FIG. 5 is a schematic diagram showing an example of the magnetic flux in an antenna coil unit when noise is being suppressed.
Figure 6:
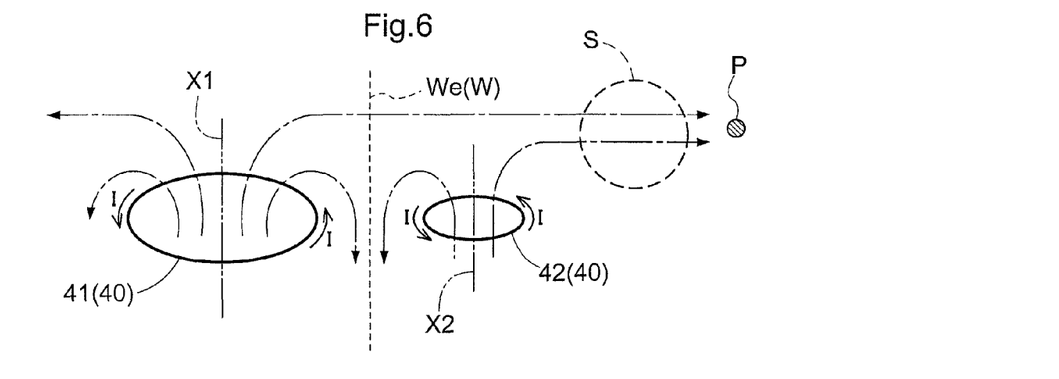
FIG. 6 is a schematic diagram showing an example of the magnetic flux in an antenna coil unit when noise is not being suppressed.

FIG. 4 shows the frequency characteristics of the transmission efficiency (solid line) and the noise emission rate (chained line) in a power transmission circuit such as is shown in FIG. 3, the power transmission circuit being formed when the main coil 41 and the auxiliary coil 42 are arranged adjacent to each other, as shown in FIGS. 5 and 6. As shown in FIG. 4, two frequencies corresponding to extreme values are present in the transmission efficiency. The lower of these two frequencies is referred to as a first extreme frequency f1, and the higher of the two frequencies is referred to as a second extreme frequency f2. The symbol "fc" in FIG. 4 indicates the resonance frequency of the auxiliary resonance circuit 5c.

At the first extreme frequency f1, the main resonance circuit 5p and the auxiliary resonance circuit 5c are coupled under a first condition in which a magnetic field is produced by the flowing of an electric current (I), as shown in FIG. 5. A point P indicates a point set apart from the space in which the magnetic field coupling the power-supply-side and power-receiving-side resonance circuits 5 is formed. The magnetic flux from the main coil 41 in FIG. 5 is directed toward the auxiliary coil 42; therefore, magnetic flux approaching the vicinity of the point P (e.g., a region S) is suppressed. Specifically, the noisy electromagnetic wave due to the harmonic component of the fundamental component of the electromagnetic wave produced by the electric current flowing through the main coil 41 is suppressed.

Conversely, at a frequency "f3" between the resonance frequency fc of the auxiliary resonance circuit 5c and the second extreme frequency f2, the main resonance circuit 5p and the auxiliary resonance circuit 5c are coupled under a second condition in which a magnetic field is formed by the flowing of an electric current (I), as shown in FIG. 6. In FIG. 6, the magnetic flux from the main coil 41 and the magnetic flux from the auxiliary coil 42 are directed in the same direction; therefore, these fluxes readily reach the point P. The magnetic flux in the vicinity of the point P (in the region S) is different in the case of the first condition (FIG. 5), and is directed in the same direction as the magnetic flux from the main coil 41; therefore, the magnetic flux in the vicinity of the point P is strengthened to a greater extent than when no auxiliary coil 42 is provided. Specifically, the noisy electromagnetic wave produced by the harmonic component of the fundamental component of the electromagnetic wave produced by the electric current flowing through the main coil 41 is strengthened.

Specifically, as shown in FIG. 4, the frequency characteristic of the noise emission rate (chained line) from the main resonance circuit 5p shows a minimal value under the first condition (at the frequency f1), and shows a maximal value under the second condition (at the frequency f3). Therefore, it is preferable to set the resonance frequency fc of the auxiliary resonance circuit 5c so that the frequency of the electromagnetic wave having a noise component generated by the main resonance circuit 5p has the first extreme frequency f1. Specifically, the auxiliary coil 42 is preferably configured in a state in which a frequency deviating by a predefined amount (e.g., "fs") in a predefined direction (e.g., the direction along which the frequency increases) from a target frequency (e.g., "f1") predefined within a harmonic component of the fundamental component of the electromagnetic wave produced by the electric current flowing through the main coil 41 is taken as the resonance frequency fc.

When the main coil 41 and the auxiliary coil 42 are arranged adjacent to each other on substantially the same plane, as in FIGS. 5 and 6, the first condition can be referred to as a "magnetic wall condition," under which a symmetric plane W between the main coil 41 and the auxiliary coil 42 is referred to as a "magnetic wall." Additionally, the second condition can be referred to as an "electric wall condition," under which the symmetric plane W between the main coil 41 and the auxiliary coil 42 is referred to as an "electric wall." The term "symmetric plane W" used here refers to a plane provided at a position so as to divide the space between the region in which the main coil 41 is arranged and the region in which the auxiliary coil 42 is arranged. Specifically, the symmetric plane W is a plane set so that the region in which the main coil 41 is arranged and the region in which the auxiliary coil 42 is arranged are symmetrically arranged on either side of the symmetric plane W. Due to their being described in detail in "Takehiro Imura, Yoichi Hori: "Wireless Power Transfer Using Electromagnetic Resonant Coupling" IEEJ Journal Vol. 129, No. 7, 2009," the concepts behind magnetic walls and electric walls will instead be described somewhat more generically below.

Figure 7:
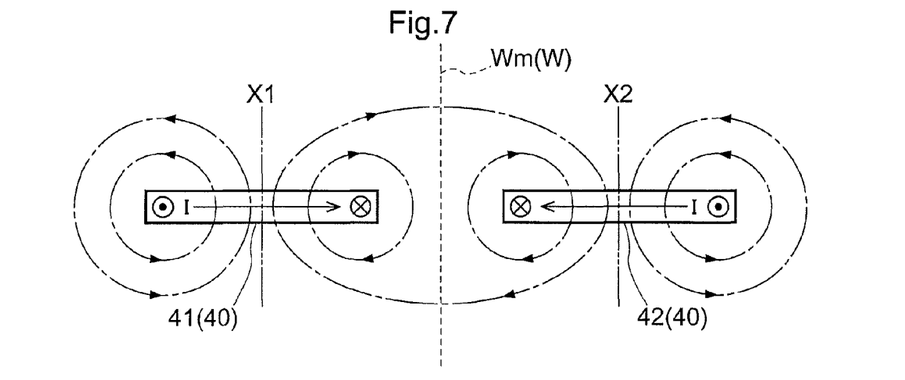
FIG. 7 is a schematic diagram showing the relationship between a magnetic field and an electric current under a magnetic wall condition.
Figure 8:
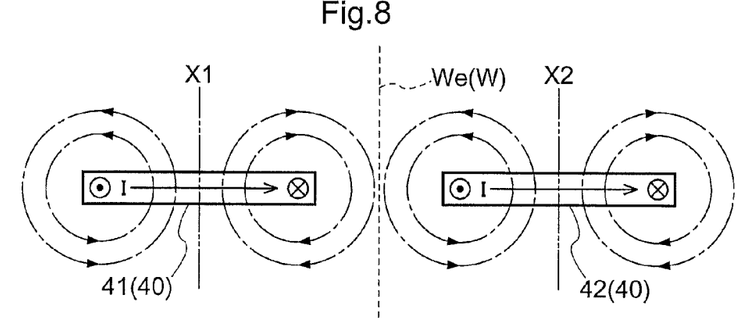
FIG. 8 is a schematic diagram showing the relationship between a magnetic field and an electric current under an electric wall condition.

FIG. 7 shows an example of a case in which a magnetic wall Wm is formed as the symmetric plane W, and FIG. 8 shows an example of a case in which an electric wall We is formed as the symmetric plane W. The magnetic field is orthogonal in the case of the magnetic wall Wm, as shown in FIG. 7, and is parallel in the case of the electric wall We, as shown in FIG. 8. The directions in which the magnetic and electric fields act are offset by 90°; therefore, although not shown, the electric field is parallel in the case of the magnetic wall Wm and is orthogonal in the case of the electric wall We.

As shown in FIG. 7, when the main coil 41 and the auxiliary coil 42 are arranged adjacent to each other on substantially the same plane, the phase of the AC current flowing through the auxiliary coil 42 is in an opposite-phase state, which is opposite the phase of the harmonic component in an AC current flowing through the main coil 41, under the first condition (magnetic wall condition) in which a magnetic wall Wm is formed. In the opposite-phase state, the difference in phase between the phase of the AC current flowing through the main coil 41 and the phase of the AC current flowing through the auxiliary coil 42 is not limited to being exactly 180°; a certain degree of shifting is permitted. The magnetic wall condition is not established when the difference in phase is 180°±90°; therefore, a range of 180°±less than 90° (90°<difference in phase<270°) is physically permitted. Specifically, the opposite-phase state may be any state in which, as viewed from a direction along the first reference axis X1, the harmonic component AC currents flowing through the conducting wire of the main coil 41 and the conducting wire of the auxiliary coil 42 are oriented in different directions when the harmonic components exhibit positive and negative peaks (peaks and troughs). However, in consideration of the noise-suppression effect, the difference in phase preferably is approximately 180°±less than 45° (135°<difference in phase<225°). As shall be apparent, a difference in phase of 180° is most preferable.

As shown in FIGS. 5 and 7, the auxiliary resonance circuit 5c preferably is configured so as to satisfy the first condition (magnetic wall condition), in which a magnetic wall Wm is formed, when the main coil 41 and the auxiliary coil 42 are arranged adjacent to each other such that the reference axes are parallel to each other.

As described above, the auxiliary coil 42 is arranged at a position in which an induction current is produced by a magnetic field produced by the electric current flowing through the main coil 41. Furthermore, the auxiliary coil 42 is configured in a state in which a frequency deviating by a predefined amount in a predefined direction from a target frequency predefined within a harmonic component of the fundamental component of an electromagnetic wave produced by the electric current flowing through the main coil 41 is taken as a resonance frequency, and constitutes the auxiliary resonance circuit 5c. The experiments and simulations performed by the inventor(s) indicate that the resonance frequency fc of the auxiliary resonance circuit 5c preferably is determined as described below.

(S1) The primary-side (power-supply-side resonance circuit 25) and secondary-side (power-receiving-side resonance circuit 35) terminal pairs t1 are opened/short-circuited, whereby the degree of coupling "K" as viewed from the auxiliary resonance circuit 5c is measured.

(S2) The relative impedance Lm of the main coil 41 (e.g., the primary-side main coil) and the auxiliary coil 42 is determined (Lm=K·Ln).

(S3) On the basis of formula (1) below, the value Cn of the capacitor 62 for the harmonic frequency to be attenuated is calculated (formula (2)).

$$f1 = \frac{1}{2\pi\sqrt{(Ln+Lm)\cdot Cn}} \quad (1)$$

$$Cn = \frac{1}{4\pi^2 \cdot f1^2 \cdot (Ln+Lm)} \quad (2)$$

(S4) Using formula (3) below, the set frequency (resonance frequency fc) of the auxiliary resonance circuit 5c is calculated. The circuit constants (Ln, Cn) of the auxiliary resonance circuit 5c are already determined in step (S3) above; therefore, from a practical standpoint, it is unnecessary to compute the resonance frequency fc.

$$fc = \frac{1}{2\pi\sqrt{Ln\cdot Cn}} \quad (3)$$

Figure 9:
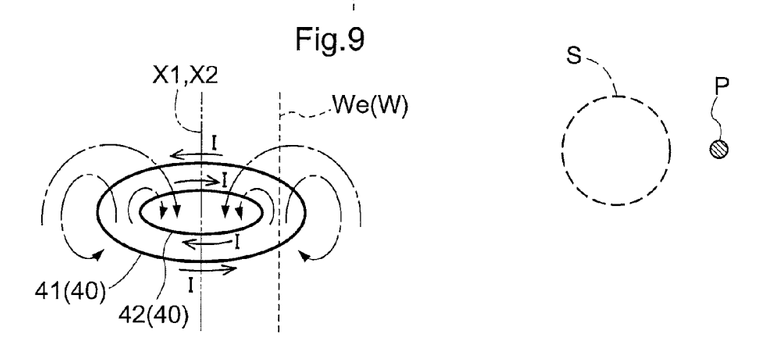
FIG. 9 is a schematic diagram showing another example of the magnetic flux in an antenna coil unit when noise is being suppressed.

In the example described above, the auxiliary coil 42 was arranged so as to satisfy the magnetic wall condition, and the auxiliary resonance circuit 5c was configured using the auxiliary coil 42. However, this embodiment is not provided by way of limitation; it is also possible to suppress noise by arranging the auxiliary coil 42 so as to satisfy the electric wall condition. Such an embodiment is described below. FIG. 9 shows an example of an embodiment in which the main coil 41 and the auxiliary coil 42 are concentrically arranged on substantially the same plane, in a state in which the reference axes are parallel to each other. In FIG. 9, the auxiliary coil 42 is arranged within the main coil 41, and an electric wall We is formed as the symmetric plane W. The term "concentric" used here may refer to a circumstance in which the auxiliary coil 42 is arranged within the main coil 41, or a circumstance in which the main coil 41 is arranged within the auxiliary coil 42, it not being essential for the first reference axis X1 and the second reference axis X2 to coincide.

Figure 10:
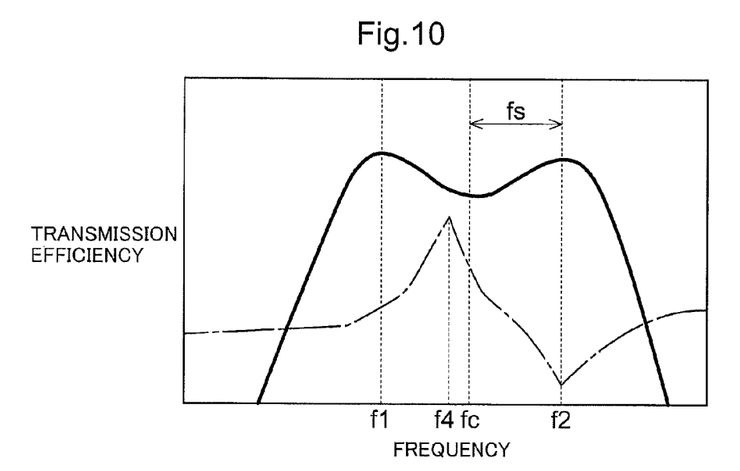
FIG. 10 is a diagram showing frequency characteristics of the transmission efficiency and the noise emission rate.

However, under such circumstances, the frequency characteristics differ from those in the embodiment shown in FIG. 4, and characteristics such as are shown in FIG. 10 are exhibited. The frequency characteristics of the rate at which noise is emitted from the main resonance circuit 5*p* (chained line) shows a minimal value under the second condition (at the frequency f2), and shows a maximal value under the first condition (at the frequency f4). Therefore, it is preferable to set the resonance frequency fc of the auxiliary resonance circuit 5*c* so that the frequency of the electromagnetic wave generated by the main resonance circuit 5*p* has the second extreme frequency f2. Specifically, the auxiliary coil 42 is preferably configured in a state in which a frequency deviating by a predefined amount (e.g., "fs") in a predefined direction (e.g., the direction along which the frequency decreases) from a target frequency (e.g., "f2") predefined within a harmonic component of the fundamental component of the electromagnetic wave produced by the electric current flowing through the main coil 41 is taken as the resonance frequency fc.

Even in the embodiment shown in FIG. 9, when the condition under which the electromagnetic waves having a noise component are reduced (referred to here as "the second condition" (electric wall condition)) is satisfied, the phase of the AC current flowing through the auxiliary coil 42 is in an opposite-phase state, which is opposite the phase of the harmonic component in an AC current flowing through the main coil 41. Specifically, the opposite-phase state is a state in which, as viewed from a direction along the first reference axis X1, the harmonic component AC currents flowing through the conducting wire of the main coil 41 and the conducting wire of the auxiliary coil 42 are oriented in different directions when the harmonic components exhibit positive and negative peaks (peaks and troughs).

In this case, the resonance frequency fc of the auxiliary resonance circuit 5*c* is determined as described below. The arrangement is substantially the same as in steps (S1)-(S4) described above, but because the direction of deviation is a reversed positive-negative direction, formulae (1) and (2) in step (S3) are replaced with formulae (4) and (5) below.

$$f2 = \frac{1}{2\pi\sqrt{(Ln - Lm) \cdot Cn}} \quad (4)$$

$$Cn = \frac{1}{4\pi^2 \cdot f2^2 \cdot (Ln - Lm)} \quad (5)$$

Figure 11:
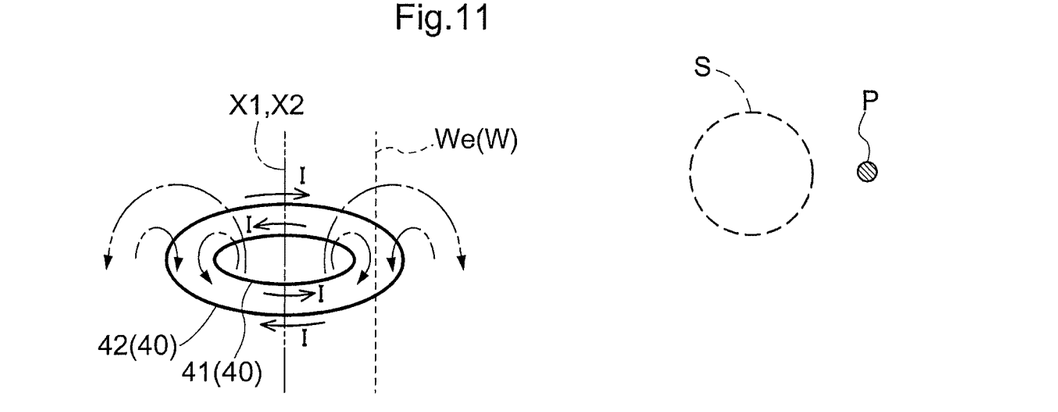
FIG. 11 is a schematic diagram showing a different example of the magnetic flux in an antenna coil unit when noise is being suppressed.

FIG. 9 shows an example of an embodiment in which the auxiliary coil 42 is arranged within the main coil 41, as an embodiment in which the main coil 41 and the auxiliary coil 42 are concentrically arranged in a state in which the reference axes are parallel to each other. However, it is also possible to adopt an embodiment in which the main coil 41 is arranged within the auxiliary coil 42, as shown in FIG. 11, as an embodiment in which the main coil 41 and the auxiliary coil 42 are concentrically arranged on substantially the same plane in a state in which the reference axes are parallel to each other. An electric wall We is formed in this case as well, as shown in FIG. 11. There is no change to the fact that the phases of the AC current flowing through the main coil 41 and the AC current flowing through the auxiliary coil 42 are reversed, nor to the method for determining the resonance frequency fc; therefore, these features are not repeated here.

In the embodiments described above, examples were illustrated in which a power storage device mounted in a vehicle 9 was wirelessly powered; however, as shall be apparent, the present invention is not limited to being applied to a vehicle. For example, the present invention can be applied to the transmission of electric power generated by small-scale hydroelectric power generation, photovoltaic power generation, or small-scale wind-power generation to an ordinary house or building; specifically, the present invention can be used for power transmission in a smart grid system. Additionally, the countermeasure against noise using the auxiliary resonance circuit 5*c* (noise-canceling resonance circuit) is not limited to being applied to power transmission; this countermeasure can be used to reduce noise in, e.g., an electromagnetic cooking device or various other systems or devices in which a coil generates noise.

INDUSTRIAL APPLICABILITY

The present invention can be applied to an antenna coil unit for transmitting electric power or the like.

REFERENCE SIGNS LIST

1 Wireless power-supply system (power-supply device)
2 Power-supply system (power-supply circuit)
3 Power-receiving system (power-receiving circuit)
4 Antenna coil
5 Resonance circuit
5*c* Auxiliary resonance circuit
5*p* Main resonance circuit
40 Antenna coil unit
41 Main coil
42 Auxiliary coil
X1 First reference axis
X2 Second reference axis
f1 First extreme frequency
f2 Second extreme frequency
fc Resonance frequency

The invention claimed is:
1. An antenna coil unit comprising:
a main coil configured by winding a conducting wire around a first reference axis; and
an auxiliary coil configured by winding a conducting wire around a second reference axis in a state of being electrically insulated from the main coil, the auxiliary coil being arranged at a position in which an induction current is produced by a magnetic field produced by an electric current flowing through the main coil;
wherein:
the main coil is at least one of (a) a primary coil constituting a power-supply circuit and (b) a secondary coil constituting a power-receiving circuit, in a power-supply device for transmitting electric power from the power-supply circuit to the power-receiving circuit using electromagnetic resonance coupling,
the auxiliary coil does not contribute to transmission of electric power,
the auxiliary coil is arranged at a position in which an induction current is produced by a magnetic field produced by the electric current flowing through the main coil, the auxiliary coil is used in an auxiliary resonance circuit which is independent of the at least one of the power-supply circuit and power-receiving circuit, the auxiliary resonance circuit is configured in a state in which a frequency deviating by a predefined amount in a predefined direction from a target frequency predefined within a harmonic component of a fundamental component of an electromagnetic wave produced by the electric current flowing through the main coil is taken as a resonance frequency, the direction and amount are such that the phase of an alternating-current (AC) current flowing through the auxiliary coil is in an opposite-phase state, which is opposite the phase of the harmonic component in an AC current flowing through the main coil, and the first reference axis and the second reference axis are parallel.

2. The antenna coil unit of claim 1, wherein the opposite-phase state is a state in which, as viewed from a direction along the first reference axis, the harmonic component AC currents flowing through the conducting wire of the main coil and the conducting wire of the auxiliary coil are oriented in different directions at the peaks of the harmonic components.

3. The antenna coil unit of claim 1, wherein the auxiliary resonance circuit includes the auxiliary coil and a capacitor, and the target frequency and the resonance frequency are represented by the following formulae:

$$f1 = \frac{1}{2\pi\sqrt{(Ln+Lm)\cdot Cn}} \text{ or}$$

$$f2 = \frac{1}{2\pi\sqrt{(Ln-Lm)\cdot Cn}} \text{ and}$$

$$fc = \frac{1}{2\pi\sqrt{Ln\cdot Cn}},$$

where Ln is a self-inductance of the auxiliary coil, Lm is a mutual conductance between the main coil and the auxiliary coil, Cn is a capacitance of the capacitor, f1 or f2 is the target frequency, and fc is the resonance frequency.

4. The antenna coil unit of claim 2, wherein the auxiliary resonance circuit includes the auxiliary coil and a capacitor, and the target frequency and the resonance frequency are represented by the following formulae:

$$f1 = \frac{1}{2\pi\sqrt{(Ln+Lm)\cdot Cn}} \text{ or}$$

$$f2 = \frac{1}{2\pi\sqrt{(Ln-Lm)\cdot Cn}} \text{ and}$$

$$fc = \frac{1}{2\pi\sqrt{Ln\cdot Cn}},$$

where Ln is a self-inductance of the auxiliary coil, Lm is a mutual conductance between the main coil and the auxiliary coil, Cn is a capacitance of the capacitor, f1 or f2 is the target frequency, and fc is the resonance frequency.

* * * * *